May 26, 1953     M. L. DULL     2,639,777
METHOD AND DEVICE FOR IMPARTING LATERAL
MOVEMENT TO AN AUTOMOBILE
Filed Jan. 12, 1948     3 Sheets-Sheet 1
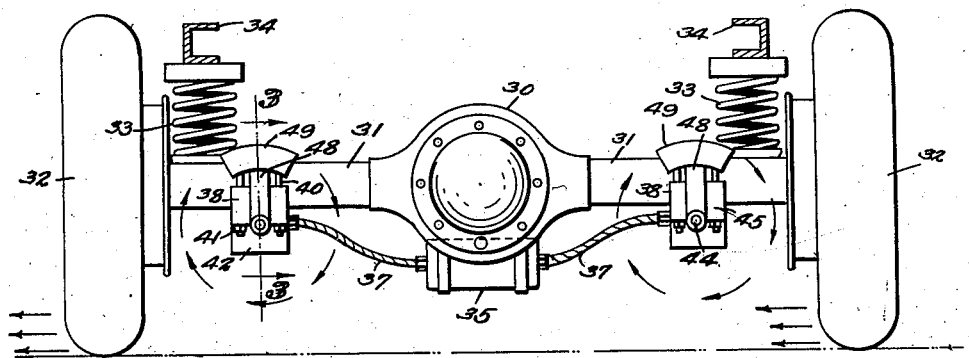
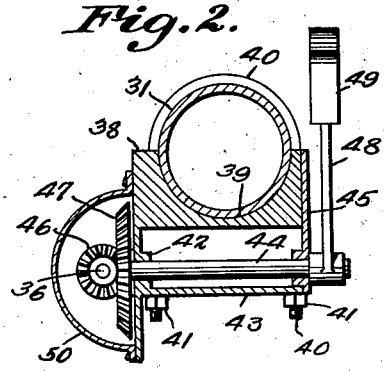
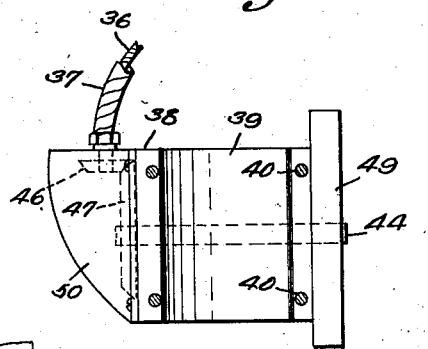
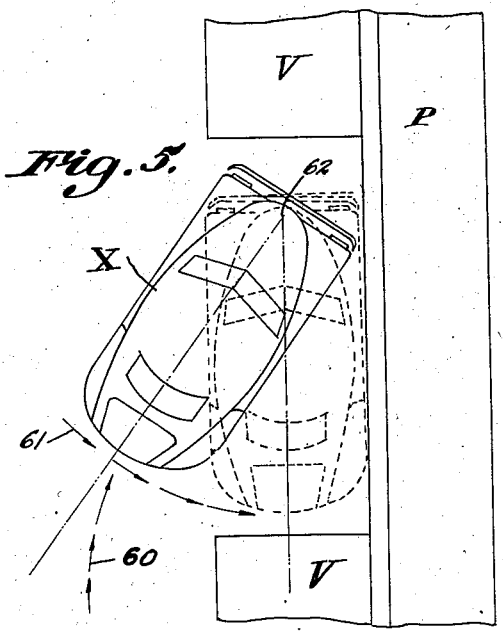
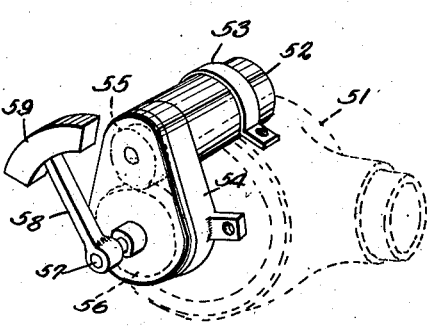
M. L. Dull
INVENTOR
BY C. A. Snow & Co.
ATTORNEYS.

May 26, 1953  M. L. DULL  2,639,777
METHOD AND DEVICE FOR IMPARTING LATERAL MOVEMENT TO AN AUTOMOBILE
Filed Jan. 12, 1948  3 Sheets-Sheet 2
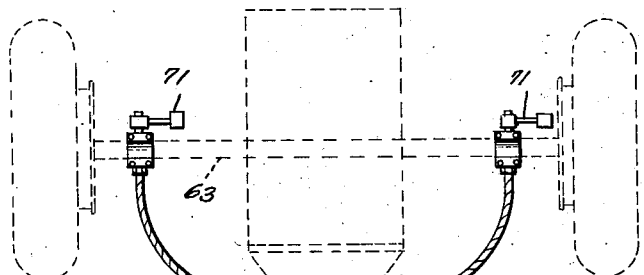
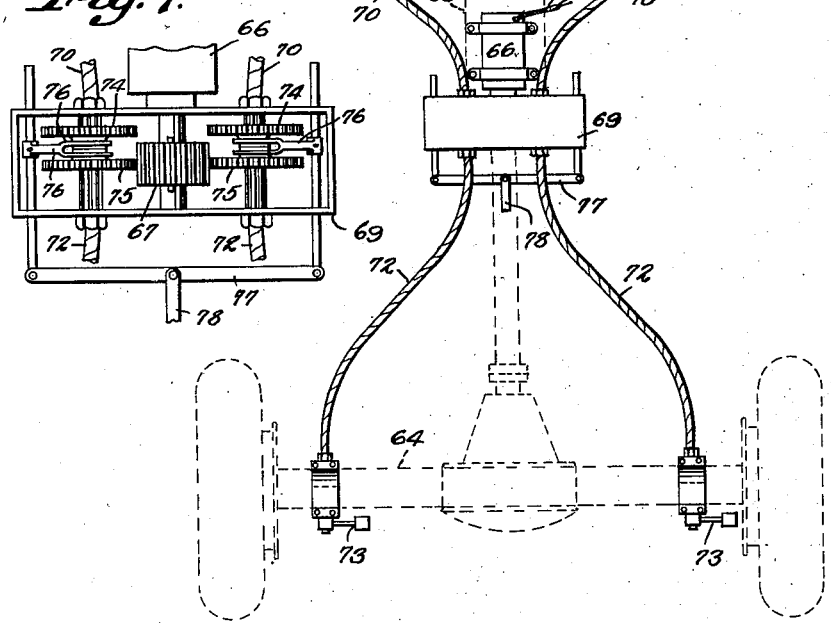
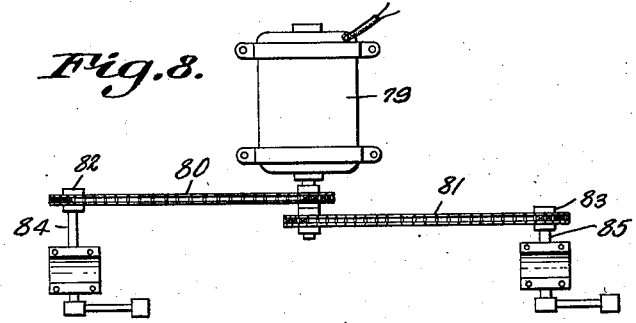
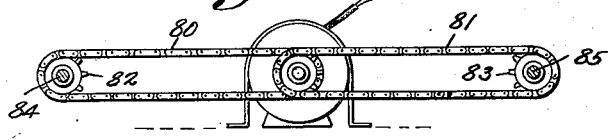
M. L. Dull
INVENTOR
BY C. A. Snow & Co.
ATTORNEYS.

Patented May 26, 1953

2,639,777

UNITED STATES PATENT OFFICE 2,639,777

METHOD AND DEVICE FOR IMPARTING LATERAL MOVEMENT TO AN AUTOMOBILE

Marshall L. Dull, Wilmington, Del., assignor, by direct and mesne assignments, to Rotomatic, Incorporated, a corporation of Delaware Application January 12, 1948, Serial No. 1,778

6 Claims. (Cl. 180—1)

This invention relates to a scheme for imparting motion to an object over a supporting surface, and to the adaptation thereof to an automobile parking and turning device.

It is highly desirable that means be provided whereby an object can be moved from one location on a supporting surface upon which the object normally rests in frictional engagement therewith, to another location on said surface. It is desirable, further, that such a means or mechanism be of great simplicity, and that it be adapted to constitute an attachment to the object. This is true in case the object to be moved is one which, normally, would rest unmoving on its supporting surface. Such would be the situation, for instance, in the case of a crate, a casting, a piece of factory machinery, or the like. This is also true in case the object is one that is primarily adapted in itself to move over a supporting surface, but in another manner. Such would be the situation in the case of an automobile, where the means which I have spoken of would be adapted to impart abnormal rather than normal movement, as by moving it laterally in parking it or leaving a parking space. In either event, it is seen that the means or mechanism should be such as would not require inherent change in the design, to a radical extent, of the object to which it is applied.

A means to be used as described should, additionally, be controllable with a high degree of accuracy, so that the object to be moved can be given motion at a controlled rate of speed, can be started and halted at the desired points, and can, where necessary, be controlled during movement with regard to the relative locations of its front and back.

It is further highly desirable that such a scheme for imparting motion be one which does not require that some portion of the mechanism be brought into engagement with the supporting surface, because such mechanisms invariably tend toward complexity in formation and operation, lack of control, excessive limitation as to the occasions when they can be used, or a combination of these. Considering the invention as applied to a parking device, for example, I am aware of previous devices which bring shoes or feet, or separate wheels, into engagement with the supporting surface for the purpose of moving a vehicle laterally. Some of these depend on transverse inclination of a street surface for their operation. These and others, additionally, quite often lack control, or can be used only for parking a vehicle, and not for bringing it out of a parking space. As applied to a parking device, the invention operates, I believe, on different principles from any of the parking devices of which I have been aware, and has none of the specified characteristics of form and operation of the previously conceived mechanisms.

Broadly, the invention embodies what may be termed a force mass, for example a fly-ball weight, so mounted on and moved relatively to an object mass that is frictionally in contact with and supported by a supporting surface, as to set up a co-action among the force mass, object mass and supporting surface, which has the end result of giving a walking or bouncing motion to the object mass over the supporting surface. The adaptation of this motion imparting scheme to an automobile parking device described herein is but one, as will be apparent, of various possible applications.

With the foregoing objects in view and others which will appear as the description proceeds, the invention comprises certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is an end elevational view of one form of automobile parking and turning device, mounted on the rear axle assembly, and constituting one adaptation of the motion imparting scheme according to my invention.

Figure 2 is an enlarged section taken substantially on line 3—3 of Figure 1.

Figure 3 is a top plan view, the vehicle member to which the device is attached being omitted.

Figure 4 is a perspective view showing another form of parking device, portions of the vehicle being illustrated in dotted lines.

Figure 5 is a plan view illustrating the movement of a vehicle being parked, when equipped with the device.

Figure 6 is a top plan view, parts being shown in horizontal section, showing the device mounted on both the front and rear axle assemblies of a vehicle, the vehicle being shown in dotted lines.

Figure 7 is an enlarged top plan view of a gear arrangement of the form of Figure 6, with the cover of the gear housing removed.

Figure 8 is a top plan view of another form of parking device employing a chain drive.

Figure 9 is a view partly in end elevation and partly in section of the form of Figure 8.

Figure 10:
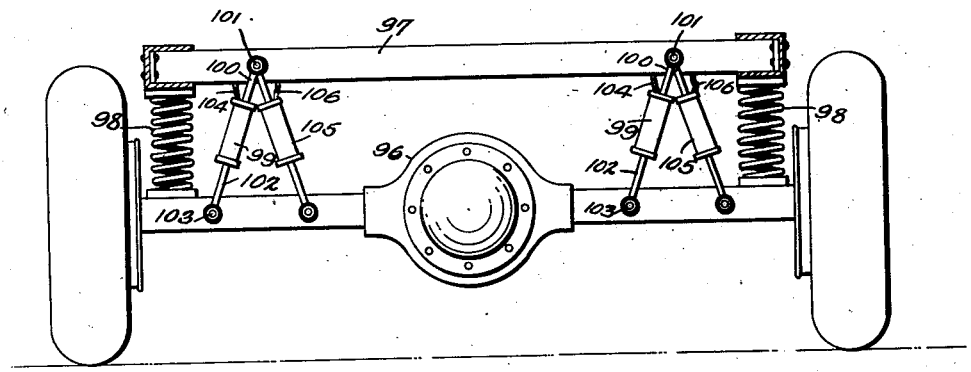
Figure 10 is an end elevation of still another form of parking device utilizing an obliquely disposed reciprocating linkage to the automobile body, instead of a rotating fly-ball weight.

Referring now to Figures 1 through 9, there is illustrated in these figures several embodiments of the invention, as applied to an automobile parking and turning device. This is probably the readiest application, but I believe that there are many others.

In Figures 1 through 3, one form of parking device constructed in accordance with the invention is illustrated, in the present instance mounted on the rear axle assembly of an automobile chassis. It could as well be mounted on the front axle assembly or both axle assemblies, as will become apparent.

In this case, the automobile itself constitutes the entire object mass to be moved. The automobile is of wholly conventional construction, and has a differential housing 30, axle housings 31 leading therefrom, wheels 32, springs 33, and frame members 34. The device is mounted on the rear axle assembly represented by parts designated 30 through 32, rather than on the flexibly supported body represented by frame members 34.

Suitably secured at any preferred location, as for example to the differential housing 30, is a power source, here shown as an electric motor 35. It is preferred that this motor be of the reversible type, and controllable as to speed. The motor is operated from the dash board of the vehicle by the use of suitable switches, not shown.

Rotatable by the motor 35 are flexible drive shafts 36, contained in housing 37. These lead to blocks 38 recessed as at 39 so as to be capable of being fitted against the axle housings 31 between differential housing 30 and each wheel 32. U-bolts or clamps 40, carrying nuts 41, hold the blocks assembled with the axle housings.

Depending from each block 38, and rigid therewith, is a bearing plate 42, having a forwardly extended portion 43, thus defining a chamber in which rotates a driven shaft 44. Removably secured to the front of the block 38 is a cover plate 45 for this chamber, which also serves as a bearing for the driven shaft 44, in cooperation with the bearing plate 42.

Rotatable by the flexible shaft 36 is a bevel gear 46, meshing with bevel gear 47 that rotates the driven shaft 44. In one unit the gear 47 is mounted on shaft 44 ahead of shaft 36, instead of rearwardly as shown. Thus, it becomes apparent that the driven shafts 44 carried at the respective sides of the rear axle assembly may be driven synchronously in the same direction and at the same controlled rate of speed.

Rigid with the outer end of each driven shaft 44 is a crank arm or bar 48. This carries a fly-ball weight 49.

It may be noted at this point that although the device of Figure 1 shows two fly-ball weights, these synchronously rotating fly-ball weights 49 constitute in effect one force mass carried by the automobile or object mass to be moved. Where two weights are used, each is of half the mass required where one is used.

The bevel gears 46 and 47 can be covered by a removable gear housing 50.

In using a device as shown in Figures 1 through 3, it will be understood that the forward or rearward motion of the vehicle will usually have been stopped. The purpose now is to move the vehicle laterally over the road. For this purpose, the vehicle constitutes an object mass frictionally and resiliently supported on a supporting surface. It is to be understood that while usually the forward or rearward motion of the vehicle will have been stopped before motion according to the invention is imparted thereto, nevertheless it is possible, and should be understood that the lateral motion can be given to the vehicle while it is in normal forward or rearward motion.

Rotation is now imparted to the fly-ball weights 49, so that they begin rotating in phased unison. Upon their being accelerated up to an operational rate of speed, the dynamic operating cycle begins, and the portion of the vehicle to which the weights are attached is given a walking or bouncing motion over the supporting surface. When the fly-ball weights 49 rotate in the direction of the arrows illustrated in Figure 1, the object mass represented by the rear axle assembly moves in the direction illustrated by the arrows adjacent the wheels 32. If the weights were to be rotated in the opposite direction, the rear axle assembly would, of course, be moved to the right in Figure 1 instead of to the left as illustrated.

The use of the invention on a conventional automobile brings into prominence an important characteristic which, while not critical to the operation of the invention, greatly increases the overall operating efficiency of the device as applied to an automobile. By causing the rotational frequency of the weights or force mass to coincide with the natural free vibrational frequency of the axle assembly, it becomes possible to take advantage of free vibrational resonance. Stated otherwise, after initial movement of the weights or force mass through the first few cycles, the period of each cycle is caused to coincide with the period of free vibration of the axle assembly. In this way, the overall ease with which the operation is accomplished is notably increased, with the power source 35 being given aid by the resonance of the axle assembly. The force mass accordingly acts as a vibratory member arranged to vibrate the axle assembly, the vibration being most effective when at a frequency corresponding to the assembly's period of natural or free vibration.

Referring now to Figure 4, an alternative form of device is illustrated, this form showing a single fly-ball weight mounted on the center of the rear axle assembly, as on differential housing 51. In this form, a motor 52 is secured to the differential housing 51 as by a strap 53 and gear cover plate 54. Gear 55 rotated by the shaft of the motor is in mesh with gear 56 on the driven shaft 57, said driven shaft having rigidly secured thereto crank bar 58 carrying fly-ball weight or force mass 59. In this instance, the device is again shown at the rear of the vehicle, but as in Figure 1, it can as well be mounted at the front of the vehicle, or at both ends.

In Figure 5 is illustrated one way in which a vehicle X can be parked. The figure shows, in addition to the vehicle a pavement P with parked vehicles V defining a parking space into which it is desired to move vehicle X.

Vehicle X is simply nosed directly into the parking space, in the manner illustrated by arrows 60. Having been halted, the rear end of the vehicle is swung in an arcuate path illustrated by arrows 61. It has been found that in moving the vehicle from the full line to the dotted line position illustrated, a turning movement will be imparted thereto, with the rear axle assembly being in effect walked or bounced toward the curbing, the said vehicle X turning around a point 62 disposed approximately under the center of the front axle.

In parking a vehicle as illustrated in Figure 5, a device as described above located at the rear axle assembly thereof would be used, with the fly-ball weights being rotated synchronously in one direction. Using a rear end device, the vehicle X can be as well brought out of the parking space by rotation of the fly-ball weights in the opposite direction, and in this instance, the rear end of the vehicle will swing outwardly back to the full line position shown.

Thus, it is apparent, that with a similar device located on the axle assemblies at each end of the vehicle, opposive use of the units moves the vehicle in what is best termed a turn-table action. In this way, the vehicle could if desired be turned completely around a point near its center, as in a narrow street or other restricted area. Or, the devices at each end can be used cooperatively, rotating them in phased unison, thus to move the vehicle as a whole laterally into a parking space to which it is in parallel relation. It is understood that the vehicle can be brought out of the parking space in the same manner.

Again, units at the opposite ends of the vehicle can be used alternately, so that a swinging movement is imparted to each end in turn.

Referring now to Figures 6 and 7, 63 designates the front axle of a vehicle and 64 the rear. The vehicle has the usual gear box 65.

A motor 66 has a pinion 67 on its shaft, the motor being reversible and connected through cable 68 to a suitable switch means, not shown. Pinion 67 is disposed within a housing 69, into which extend flexible shafts 70 leading to the front, and flexible shafts 72 leading to the rear. Shafts 72 rotate fly-ball weights 73 in phased unison, while shafts 70 thus rotate weights 71.

Adapted to rotate each shaft 70 are gears 74, and adapted to rotate shafts 72 are gears 75. These gears are splined to their respective shafts so as to be rotatable therewith while yet being permitted limited sliding movement.

Fork arms 76 are interposed between each gear 74 and adjacent gear 75, so as to move them jointly. The fork arms are operatively connected by link 77 operated by rod 78 leading to the interior of the vehicle.

In this manner, it may be noted that by selective operation of rod 78, the gears 75 alone can be in mesh with pinion 67, thus to rotate the fly-ball weights 73 at the rear of the vehicle while leaving those at the front of the vehicle idle. Or, those at the front of the vehicle may be operated to the exclusion of the weights at the rear. This permits parking or "unparking," swinging either end of the vehicle as desired. Finally, the units at both front and rear can both be operated by bringing both pairs of gears 74 and 75 in mesh with the pinion 67, thus to permit lateral parking as described above. Turn-table action would not be possible with this particular form, but it is apparent that the forms of Figures 1 through 4, and also Figures 8 and 9, do permit this action, as well as the swinging and parallel action, when mounted on both ends of the vehicle.

In Figures 8 and 9, another form is illustrated, wherein a motor 79 is adapted to power chains 80 and 81, that rotate sprockets 82 and 83. The sprockets rotate the driven shafts 84 and 85.

I believe it is clear from the description provided herein that the manner in which the various driven shafts that carry the fly-ball weights are driven is capable of great variation. It has been intended herein to show merely for purposes of illustration several different types of drive means which can be employed. Furthermore, it is of importance to note that the motion imparting scheme according to my invention has many possible applications, in addition to its adaptation to an automobile parking and turning device, which is described herein to show one useful application of the invention.

While I do not wish to be limited to any particular theory of operation, I believe that the embodiment of my invention which utilizes a rotating fly-ball weight, functions in the following manner:

As the speed of rotation of the fly-ball weight is increased, the centrifugal force exerted thereby increases, until it becomes sufficient to lift that part of the object mass to which it is attached from the supporting surface. Of course, this force is exerted upwardly during only part of the cycle, but downward movement of the object mass is limited by the supporting surface. Also lateral movement of the object mass is limited by friction, while it remains in contact with the supporting surface. Thus the effect of the centrifugal force alone would be a periodic lifting of the object mass from the supporting surface without sustained motion over the supporting surface from one location to another.

However, besides the centrifugal force, there is another force that acts upon the object mass in the opposite direction from that in which the fly-ball weight moves, i. e. at an angle of 90° from the direction of the centrifugal force. This is caused by a lever action of the crank arm that connects the fly-ball weight to the object mass. Whenever the object mass is free to move, the center of rotation will shift to a point on the crank arm that is determined by the relative masses and inherent rigidity of the fly-ball weight and the object mass.

The object mass is lifted from the supporting surface and free to move when the upwardly directed centrifugal force is at its maximum, i. e. when the fly-ball weight is at the top of its cycle. The aforesaid lever action can then move the object mass a slight distance in the opposite direction from that in which the fly-ball weight is moving, before the object mass falls back into frictional engagement with the supporting surface. Thus the characteristic walking or bouncing motion is imparted to the object mass over the supporting surface.

This characteristic motion may be regarded as a wave form of motion in which each successive wave (step) is alike at constant speed of rotation. The exact wave form in each case depends upon a variety of factors, such as the speed of rotation and, especially, the inherent rigidity (vertical and lateral) of the entire object mass. For example, the springs and the tires of an automobile are very important factors, in that they lessen the restraining action of the car body and of the road, i. e. make it easier to oscillate or bounce the axle assembly on which my device is mounted. In fact the springs will generally absorb all of the resultant vibrations, so that passengers in the body of the automobile will not be discomforted by the operation of my device.

In the foregoing description of my invention, it has been assumed that the rotating fly-ball weight has been caused to turn at a substantially constant and unvarying angular-velocity. Cyclic-variations in this angular-velocity (acceleration and deceleration) bring other factors into play which will have an effect on the desired end-result motion. They affect particularly the lever action of the crank arm to which I have referred previously, and result in displacing the equilibrium (center of free rotation).

If, for example, the rotating fly-ball weight is permitted or caused to increase in angular-velocity, above the average, for a part of its cycle of rotation and be permitted or caused to decrease in angular-velocity, below the average, for the ensuing part of its cycle of rotation, the net effect of this non-uniformity of angular-velocity could either increase or decrease the magnitude of the desired end-result motion, depending upon the periodic angles of its rotation at which the maxima and minima velocities are permitted or caused to assert themselves.

This matter of cyclic variation in angular velocity can, it will be appreciated, be a factor in operation of any of the parking devices illustrated and described and the invention is intended to comprehend the deliberate or permissive insertion of this factor to enhance the effectiveness of my invention.

Figure 11:
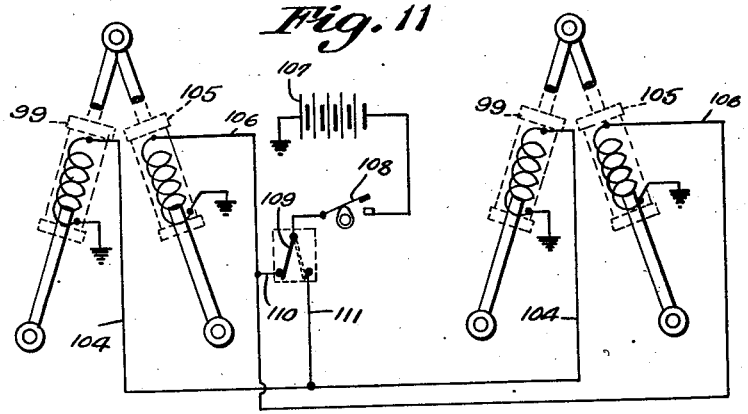
Figure 11 is a somewhat diagrammatic view of an electric circuit for the form of Figure 10.

Referring now to Figures 10 and 11, it is immediately observed that here there is illustrated another form of parking device which does not employ a fly-ball weight. However, there is clear similarity between the fly-ball weight means for imparting motion and that illustrated in these particular figures, in that in both cases the actuating means causes an object mass to bounce or walk, in a controllable direction, across an unyielding supporting surface upon which it normally rests in sustaining frictional contact, without any part of the motion-producing means being itself brought into engagement with the supporting surface.

A rear axle assembly is designated 96, and can be termed a contactor-member. A frame, including the entire vehicle body (not shown), which it supports is designated 97 and will be termed the principal structure. Springs 98 connect the structures flexibly.

In this embodiment of the invention, a direct mechanical linkage is inserted between the flexibly supported cooperating structures 96 and 97. This linkage can be any suitable device which effects an obliquely disposed connection between the two, and which can be lengthened and shortened (reciprocated) controllably and at desired frequency. In the present instance, and shown purely as an example, a pair of solenoids 99 is so disposed that each is to one side of the differential housing. An arm 100 is rigid with each solenoid at one end and pivoted at its other end, as at 101, to the principal structure 97. A core 102 in each solenoid is pivoted at 103, at its outer end, to the contactor member 96. It is to be noted that the solenoids 99 are obliquely mounted, and incline in the same direction. Through leads 104, power is supplied to energize these solenoids.

Another pair of solenoids 105 are similar in construction to the solenoids 99. This pair, however, is inclined oppositely relative to the solenoids 99. The leads to the solenoids 105 are designated 106.

In operation, the solenoids 99 are energized jointly, and the solenoids 105 are energized jointly. However, solenoids 99 are never energized at the same time as solenoids 105, and vice versa.

A possible circuit, simply illustrating how this can be done, is shown in Figure 11. A battery 107 supplies the power, and the power is led in every instance through any suitable make-and-break device, as for instance, cam-controlled breaker points 108, that will serve to energize and deenergize the particular pair of solenoids selected for operation, at the desired frequency. A switch 109 is used for closing the circuit to the proper pair, there being a lead 110 extending to the leads 106, and a lead 111 extending to the leads 104.

In operation, and assuming the circuit is closed to solenoids 99, the effect is to create a positively-displaced oblique-motion between the principal structure 97 and contactor-member 96. The principal structure will tend to move to the left and down in Figure 10 when this occurs, and the contactor-member, to the right and up. However, the structure 97 effectively resists its tendency, because it has far greater inertia. The member 96, as a result, is that member which is lifted from the supporting surface, and laterally moved, in a bouncing motion, to the right in Figure 10. As in the other forms of parking devices illustrated and described herein, the solenoids and their linkages are vibratory devices and their vibration at the axle's free vibrational frequency will, after this motion is initiated, aid the operation.

The solenoids 105, when used, will similarly serve to move the vehicle to the left in Figure 10.

It is understood that the device of Figures 10 and 11 could be used at the front rather than the rear end of the vehicle, or at both ends for use selectively, in unison, or oppositely.

In the reciprocating embodiment of my invention illustrated in Figures 10 and 11, the principal structure constitutes the force mass, and the contactor member constitutes the immediate object mass. As in the case of the rotating embodiment first described, relative motion between the force mass and the object mass produces a periodic combined upward and lateral force acting on the object mass with the same result, i. e. a walking or bouncing motion of the object mass over the supporting surface. In each case the force mass is attached to and carried along with the object mass. Both embodiments periodically lift the object mass entirely clear of the supporting surface and, in order to do so, periodically cause the object mass to exert a greater downward thrust upon the supporting surface, than is caused by the force of gravity alone. In both, a lateral force is applied to move the object mass in one direction over the supporting surface, while it is lifted clear thereof, whereas an equal and opposite lateral force is prevented by friction from causing motion in the opposite direction, while the object mass rests upon said surface.

When thus analyzed, the close relationship between the two embodiments specifically shown and described, becomes evident. Once the novel principles and mode of operation of my motion imparting scheme are understood, further embodiments and devices for carrying them into effect will become apparent to those skilled in the art, and such are included within the spirit and the scope of my invention.

In any of the arrangements of the present invention, it will be noted that the vibratory devices include guide members for constraining vibratory or reciprocating movement of a mass so that it has lateral and vertical components. The connection of this vibratory mass with a wheel and axle assembly causes this assembly to vibrate or oscillate in corresponding directions and thereby undergo lateral movement.

What is claimed is:

1. An automobile-shifting device for imparting lateral motion to an automobile including a body portion resiliently supported by wheel and axle assemblies while these assemblies are resiliently supported on the ground, said device having at least one vibratory member, a guiding structure connected to a wheel and axle assembly and holding said vibratory member, said guiding structure constraining said vibratory member to move in a cyclic path in a substantially vertical plane with the member vibrating with both vertical and transverse components, and driving elements connected to actuate the cyclic movement of said member in said path at a frequency high enough to induce the wheel and axle assembly on which said guiding structure is mounted to also undergo similar vibrations with an intensity that causes it to bounce away from and move laterally with respect to the ground in small resilient steps.

2. In combination with an automobile, a parking device for moving the rear end of the automobile into and out of parking spaces, said device having vibratory mass elements and driving mechanism connected to drive these elements into vibratory movement, said driving mechanism including guide structure connected to the rear axle of the automobile and holding said vibratory elements, said guide structure constraining the driven motion of these elements to a substantially vertical plane with components of the motion directed both vertically and laterally of the automobile, and energizing means connected to the vibratory elements to drive them at an intensity that causes the rear axle to vibrate both vertically and transversely with an amplitude sufficient to cyclically lift the rear wheels from the ground and shift them sideways.

3. A method for moving an automobile chassis in a lateral direction while it is supported by its wheels, which method is characterized by providing vibratory mass elements connected to a wheel and axle assembly of the automobile, vibrating these elements in a path that has both vertical and lateral components with respect to the chassis, and effecting such vibration with an intensity great enough to cause the wheel and axle assembly to vibrate in a similarly directed path with an amplitude large enough to cyclically lift this assembly from the ground and shift it laterally.

4. The combination of claim 1 in which the guiding structure is an off-center pivotal mounting for a vibratory member and the driving elements are connected to rotate this member around this pivotal mounting.

5. The combination of claim 2 in which the guide structure includes an extensible and contractable linkage directly connecting the vibratory mass elements with the axle and the driving mechanism is connected to alternately shorten and lengthen the guiding structure.

6. The combination of claim 5 in which the mass elements are directly connected to form an integrally held portion of the chassis of the automobile.

MARSHALL L. DULL.

References Cited in the file of this patent

UNITED STATES PATENTS

| Number | Name | Date |
|---|---|---|
| 1,508,500 | Bingen et al. | Sept. 16, 1924 |
| 1,798,100 | Moorhouse | Mar. 24, 1931 |
| 2,279,120 | Hurley | Apr. 7, 1942 |
| 2,491,994 | McFarlane | Dec. 20, 1949 |

FOREIGN PATENTS

| Number | Country | Date |
|---|---|---|
| 304,607 | Great Britain | Dec. 19, 1929 |